2,701,212

GERMICIDAL DEODORIZING DENTAL ADHESIVE AND A METHOD OF MAKING SAME

Edward J. Brennan, Hasbrouck Heights, N. J.

No Drawing. Application January 9, 1953,
Serial No. 330,581

13 Claims. (Cl. 106—208)

This invention relates generally to borax compositions and methods of producing the same, and more particularly to powdered denture adhesives, chlorophyll-containing denture adhesives and deodorant borax compositions.

It is an object of the present invention to provide an improved powdered denture adhesive.

Another object of this invention is to provide a chlorophyll-containing denture adhesive.

A further object of my invention is to provide a novel germicidal and deodorant borax composition.

Other objects of the present invention are to provide methods for adsorbing borax onto gum karaya, for adsorbing water-soluble chlorophyllins onto borax and for preparing an improved chlorophyll-containing denture adhesive.

Still another object of the present invention is to provide a germicidal and deodorant borax composition for use in denture adhesives, douche powders, mouth washes, tooth pastes, tooth powders and foot powders.

A further object of this invention is to provide a powdered denture adhesive which kills or inhibits the growth of bacteria, prevents decomposition of food and secretions beneath the denture, and prevents mouth odors.

Another object of the present invention is to provide a powdered denture adhesive having improved adhesive properties and which will retain its adhesive properties for an extended period of time while avoiding deleterious effects on the gums and mouth.

Other objects of this invention will be apparent to those skilled in the art from the following description.

I accomplish the objects of my invention generally by providing a powdered denture adhesive composition comprising about 87.5 to about 91.5 parts by weight of finely divided gum karaya and 8.5 to about 12.5 parts by weight of borax, said borax being adsorbed on said gum karaya. My invention further comprises such a composition in which about 10 parts by weight of borax are adsorbed on 90 parts by said gum karaya.

My invention additionally comprises a powdered denture adhesive composition comprising about 87.5 to about 91.5 parts by weight of finely divided gum karaya, about 8.5 to about 12.5 parts by weight of borax and about 0.1–0.5 part by weight of a water-soluble chlorophyllin. Additional modifications include such a composition wherein a portion of said water soluble chlorophyll is adsorbed on said borax and wherein said chlorophyll-containing borax is adsorbed on said gum karaya and such a composition containing about 90 parts by weight of gum karaya, about 10 parts by weight of borax and about 0.2 part by weight of a water soluble chlorophyllin.

My invention further includes a powdered borax deodorant composition comprising finely divided borax having adsorbed thereon about 0.2% to about 1% of a water soluble chlorophyllin. A further embodiment comprises such a composition having about 0.5% of a water soluble chlorophyllin adsorbed thereon.

My invention additionally provides a method of adsorbing borax on gum karaya comprising mixing ethyl alcohol, finely divided borax and finely divided gum karaya and continuing said mixing until a dry powder results. An additional embodiment includes such a method comprising admixing about 87.5 to about 91.5 parts by weight of finely divided gum karaya and about 8.5 to about 12.5 parts by weight of finely divided borax, adding about 3 to about 10 parts by weight of ethyl alcohol while mixing and continuing said mixing until a dry powder results. A further modification involves such a method wherein about 5 parts by weight of ethyl alcohol are added.

I further accomplish the objects of my invention by providing a method of adsorbing a water soluble chlorophyllin on borax comprising mixing ethyl alcohol, finely divided borax and a water soluble chlorophyllin and continuing said mixing until a dry powder results. The invention also includes a method of preparing a powdered borax deodorant composition comprising admixing finely divided borax and about 0.2% to about 1% by weight of said borax of a water soluble chlorophyllin, adding about 2% to about 5% by weight of said borax of ethyl alcohol while mixing and continuing said mixing until a dry powder results and such a method wherein about 3.3% of ethyl alcohol is added.

A further embodiment of my invention is directed to a method of preparing a powdered denture adhesive composition compriisng admixing about 87.5 to about 91.5 parts by weight of finely divided gum karaya and about 8.5 to about 12.5 parts by weight of finely divided borax having adsorbed thereon about 0.2% to about 1% of a water soluble borax, adding about 3 to about 10 parts by weight of ethyl alcohol while mixing and continuing said mixing until a dry powder results.

Another modification includes the method of preparing a powdered denture adhesive composition comprising mixing about 43.75 to about 45.75 parts by weight of finely divided gum karaya, adding about 8.5 to about 12.5 parts by weight of finely divided borax having adsorbed thereon about 0.2% to about 1% of a water soluble borax, adding about 0.1 to about 0.5 part by weight of a water soluble chlorophyllin and about 3 to about 10 parts by weight of ethyl alcohol while mixing, continuing said mixing, adding about 43.75 to about 45.75 parts by weight of finely divided gum karaya, and further continuing said mixing until a dry, homogeneous powder results.

I have discovered that ethyl alcohol when added to a mixture of borax and gum karaya effects adsorption of the borax on the gum. The resulting composition is homogeneous in contrast to mechanical mixtures produced by mixing the ingredients in the dry state or in the presence of a solvent for both borax and gum karaya, such as water. The gum karaya containing adsorbed borax is much superior to known denture adhesives.

The following examples serve to illustrate the invention:

Example I 90 lbs. gum karaya powdered superfine No. 1
10 lbs impalpable borax U. S. P. ($Na_2B_4O_7 \cdot 10H_2O$)

are mixed thoroughly for about ½ hour in a ribbon type powder mixer. 5 lbs absolute ethyl alcohol are then slowly poured into the mixture while the mixer is running.

The mass is mixed for 1½ hours after which the composition is a dry, dusty powder. The resulting composition is an improved powdered denture adhesive. In use the powder is sprinkled on the back of a dental plate, the gums are thoroughly moistened and the plate fitted into place. The plate adheres tightly to the gums and remains in place without discomfort or obnoxious taste for an extended period. Non-toxic coloring and flavoring may be added to the composition, along with the alcohol if desired.

Example II 12.5 lbs. impalpable borax U. S. P.
87.5 lbs. gum karaya powdered superfine No. 1 are mixed for ½ hour as in Example I. Thereafter, 10 lbs. absolute ethyl alcohol are sprayed into the mixture while the mixer is running and the mass mixed for 2½ hours. The resulting dry powder is an excellent dental plate adhesive.

Example III 8.5 lbs. impalpable borax U. S. P.
91.5 lbs. gum karaya powdered superfine No. 1 are mixed as in Example I for ½ hour and, thereafter, 3 lbs. absolute ethyl alcohol are added as in Example I. After mixing for 1½ hours, the resulting dry, dusty powder is an excellent powdered denture adhesive.

I have found that less than about 8.5% borax results in a denture adhesive which does not have long lasting adhesive properties. Compositions containing over about 12.5% of borax irritate the gums. About 10% of borax as in Example I is preferred. I may likewise employ from about 3 to 10 lbs. of alcohol in the above mixtures. Less than about 3 lbs. results in incomplete adsorption of the borax, whereas if more than about 10 lbs. are used, the mixing time required to yield a dry, non-lumpy powder is excessive. I prefer to use about 5 lbs. of alcohol. The borax is preferably of the type known as impalpable borax, although any finely divided product may be used. Likewise, any finely divided gum karaya may be used. The ethyl alcohol is preferably absolute alcohol, although I have found that 95% ethyl alcohol is satisfactory.

*Example IV*

200 lbs. impalpable borax U. S. P. is placed in a ribbon type powder mixer and 1 lb. of sodium-copper chlorophyllin 90% is added. The mass is mixed for about ½ hour and 6.6 lbs. (1 gallon) of absolute ethyl alcohol are slowly added while mixing. Mixing is continued for 1½ hours and the resulting borax containing adsorbed water-soluble chlorophyllin is a dry powder.

The borax-chlorophyll composition may be used in my improved denture adhesive. Additionally, such a composition is a highly effective germicidal and deodorant douche powder. The composition additionally may be used for antiseptic mouth washes, deodorant tooth pastes and powders and is highly effective as a foot powder in preventing foot odors and fungus diseases of the feet. I have found that borax is an excellent synergist for the germicidal and deodorant properties of water soluble chlorophyllins. My improved homogeneous product comprises chlorophyllin adsorbed on borax as distinguished from mechanical mixtures.

*Example V*

200 lbs. impalpable borax U. S. P.
0.4 lb. sodium-potassium copper chlorophyllin 90% are mixed as in Example IV with 4 lbs. absolute ethyl alcohol. After mixing for 1 hour, the resulting powder is dry. The composition may be used in denture adhesives, foot powders, etc.

*Example VI*

200 lbs. impalpable borax U. S. P.
2 lbs. sodium-magnesium chlorophyllin 90% are mixed as in Example IV with 10 lbs. absolute ethyl alcohol. After mixing for 2 hours, the composition is a dry, dusty powder. The composition is highly deodorant and antiseptic and is useful in my improved denture adhesive and as a douche, in tooth pastes and powders, etc.

I have found that below about 0.2% of chlorophyllins the composition is relatively ineffective as a deodorant, whereas in compositions containing more than about 1% chlorophyllins, the deodorant properties are not proportional to the quantity of chlorophyllin added. I have additionally found that about 2% of ethyl alcohol are necessary to insure complete adsorption, whereas qauntities of alcohol above about 5% require excessive mixing periods to result in a dry homogeneous powder.

The chlorophyllins may be any water-soluble chlorophyllins available, preferably in a state of purity of 90% or above.

*Example VII*

8.5 lbs. of the composition of Example VI
91.5 lbs. gum karaya powdered superfine No. 1 are mixed for ½ hour in a ribbon type powder mixer. 3 lbs. absolute ethyl alcohol are slowly poured in while mixing and mixing is continued for 1½ hours. The resulting homogeneous powder is an excellent denture adhesive having antiseptic and deodorant properties.

*Example VIII*

12.5 lbs. of the composition of Example V
87.5 lbs. gum karaya powdered superfine No. 1 are mixed as in Example VII. 10 lbs absolute ethyl alcohol are sprayed in while mixing. Mixing is continued for 2 hours. The resulting composition is dry powder which is an excellent denture adhesive.

*Example IX*

90 lbs. gum karaya powdered superfine No. 1
20 lbs. of composition of Example IV are mixed in a ribbon-type mixer for ½ hour. .3 lb. sodium-copper chlorophyllin 90% is added and mixing is continued for ½ hour. 10 lbs. absolute ethyl alcohol is slowly poured in while mixing and mixing is continued for 1 hour. 90 lbs. gum karaya powdered superfine No. 1 is added.

After mixing for 1½ hours, the composition is a dry, duty powder. The resulting composition is a superior denture adhesive powder having excellent adhesive, antiseptic and deodorant properties.

*Example X*

20 lbs. of composition of Example VI are substituted for the composition of Example IV in Example IX and 15 lbs. absolute ethyl alcohol are used. The resulting composition after final mixing of 2 hours is a dry powder having excellent adhesive and deodorant properties.

*Example XI*

17 lbs. of composition of Example IV are substituted for the 20 lbs. in Example IX and a total of 193 lbs. of gum karaya are used. The composition is prepared as in Example IX. The resulting powder is an excellent denture adhesive.

*Example XII*

25 lbs. of composition of Example V are substituted for 20 lbs. of composition of Example IV in the method of Example IX and a total of 175 lbs. gum karaya are used. After mixing as in Example IX a dry homogeneous powder results which is an effective denture adhesive.

While the invention has been described and illustrated in specific examples, it is apparent that other modifications and compositions may be devised, and it is intended to cover all such modifications and compositions which fall within the spirit and scope of the appended claims.

I claim:

1. A powdered denture adhesive composition comprising about 87.5 to about 91.5 per cent by weight of finely divided gum karaya and 8.5 to about 12.5 per cent by weight of borax, said borax being adsorbed on said gum karaya.

2. A powdered denture adhesive composition comprising about 90 per cent by weight of finely divided gum karaya and about 10 per cent by weight of borax, said borax being adsorbed on said gum karaya.

3. A powdered denture adhesive composition comprising about 87.5 to about 91.5 per cent by weight of finely divided gum karaya, about 8.5 to about 12.5 per cent by weight of borax and about 0.1–0.5 per cent by weight of a water soluble chlorophyllin.

4. The composition set forth in claim 3 wherein a portion of said water soluble chlorophyll is adsorbed on said borax and wherein said chlorophyll-containing borax is adsorbed on said gum karaya.

5. A powdered denture adhesive composition comprising about 90 per cent by weight of finely divided gum karaya, about 10 per cent by weight of borax and about 0.2 per cent by weight of a water soluble chlorophyllin.

6. A soluble powdered borax deodorant composition comprising finely divided borax having adsorbed thereon about 0.2% to about 1% of a water soluble chlorophyllin.

7. A soluble powdered borax deodorant composition comprising finely divided borax having adsorbed thereon about 0.5% of a water soluble chlorophyllin.

8. The method of preparing a powdered denture adhesive composition comprising admixing about 87.5 to about 91.5 per cent by weight of finely divided gum karaya and about 8.5 to about 12.5 per cent by weight of finely divided borax, adding about 3 to about 10 per cent by weight of ethyl alcohol while mixing and continuing said mixing until a dry powder results.

9. The method set forth in claim 8 wherein about 5 parts by weight of ethyl alcohol are added.

10. The method of preparing a powdered borax deodorant composition comprising admixing finely divided borax and about 0.2% to about 1% by weight of said borax of a water soluble chlorophyllin, adding about 2% to about 5% by weight of said borax of ethyl alcohol while mixing and continuing said mixing until a dry powder results.

11. The method set forth in claim 10 wherein about 3.3% of ethyl alcohol is added.

12. The method of preparing a powdered denture adhesive composition comprising admixing about 87.5 to about 91.5 per cent by weight of finely divided gum karaya and about 8.5 to about 12.5 per cent by weight of finely divided borax having adsorbed thereon about 0.2% to about 1% of a water soluble chlorophyllin, adding about 3 to about 10 per cent by weight of ethyl alcohol while mixing and continuing said mixing until a dry powder results.

13. The method of preparing a powdered denture adhesive composition comprising mixing about 43.75 to about 45.75 per cent by weight of finely divided gum karaya, adding about 8.5 to about 12.5 per cent by weight of finely divided borax having adsorbed thereon about 0.2% to about 1% of a water soluble chlorophyllin, adding about 0.1 to about 0.5 per cent by weight of a water soluble chlorophyllin and about 3 to about 10 per cent by weight of ethyl alcohol while mixing, continuing said mixing, adding about 43.75 to about 45.75 per cent by weight of finely divided gum karaya, and further continuing said mixing until a dry, homogeneous powder results.

References Cited in the file of this patent

UNITED STATES PATENTS

| | | |
|---|---|---|
| 2,439,460 | Engler | Apr. 13, 1948 |
| 2,534,787 | Mecca | Dec. 19, 1950 |